US006410170B1

(12) United States Patent
Chen et al.

(10) Patent No.: US 6,410,170 B1
(45) Date of Patent: Jun. 25, 2002

(54) HIGH RESISTIVITY FEXN SPUTTERED FILMS FOR MAGNETIC STORAGE DEVICES AND METHOD OF FABRICATION

(75) Inventors: Yingjian Chen, Fremont; Chester Qian, San Jose, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/315,863

(22) Filed: May 20, 1999

(51) Int. Cl.[7] ................................................. G11B 5/66
(52) U.S. Cl. ............... 428/692; 428/694 R; 428/694 T; 428/694 TS; 428/694 TM; 428/900; 204/192.2; 360/126
(58) Field of Search .............................. 428/692, 694 R, 428/694 T, 694 TS, 694 TM, 900; 204/192.2; 360/126

(56) References Cited

U.S. PATENT DOCUMENTS

| | | | | |
|---|---|---|---|---|
| 5,304,258 A | | 4/1994 | Ishiwata et al. | 148/306 |
| 5,475,554 A | | 12/1995 | Ishiwata et al. | 360/126 |
| 5,589,221 A | * | 12/1996 | Hiramoto et al. | 427/130 |
| 5,600,520 A | * | 2/1997 | Aokura et al. | 360/126 |
| 5,617,275 A | | 4/1997 | Ogura et al. | 360/113 |
| 5,725,685 A | * | 3/1998 | Hayakawa et al. | 148/306 |
| 5,736,264 A | * | 4/1998 | Ishiwata et al. | 428/694 R |
| 5,750,251 A | | 5/1998 | Ohji | 428/332 |
| 5,768,072 A | | 6/1998 | Ueta et al. | 360/126 |
| 5,774,308 A | | 6/1998 | Ohtsuka et al. | 360/126 |
| 5,777,824 A | | 7/1998 | Gray | 360/103 |
| 5,777,828 A | | 7/1998 | Kameyama et al. | 360/126 |
| 5,792,547 A | | 8/1998 | Liu et al. | 428/212 |
| 5,831,801 A | | 11/1998 | Shouji et al. | 360/126 |
| 5,835,316 A | | 11/1998 | Mukaide et al. | 360/126 |
| 5,837,392 A | | 11/1998 | Katori | 428/692 |
| 5,849,400 A | * | 11/1998 | Hiramoto et al. | 428/213 |
| 6,233,116 B1 | | 5/2001 | Chen et al. | 360/126 |

OTHER PUBLICATIONS

Barnard, J.A., Tan, M., Waknis, A., and Haftek, E., "Magnetic properties and structure of Al/Fe–N periodic multilayer thin films", *J. Appl. Phys.*, vol. 69, No. 8, Apr. 15, 1992, pp. 5298–5300.

Hong, Jongill, Sin, Kyusik, Nguyentran, Lee and Wang, Shan X., "Soft Magnetic Properties and Microstructures of FeRhN High Moment Thin Films," *IEEE Transactions on Magnetics*, vol. 33, No. 5, Sep. 1997, pp. 2845–2847.

(List continued on next page.)

*Primary Examiner*—Leszek Kiliman
(74) *Attorney, Agent, or Firm*—Carr & Ferrell LLP (57) ABSTRACT

A preferred method of the present invention provides an improved thin film for carrying magnetic flux. With the preferred method, the magnetic thin film may be formed by depositing Fe by reactive sputtering using $N_2$ to form a thin film comprising $\alpha$-Fe and $\gamma$-$Fe_4N$. With this method, the relative percentage of $\gamma$-$Fe_4N$ in the deposited film is increased to provide expanding lattice constants for both the $\alpha$-Fe and the $\gamma$-$Fe_4N$. Increasing $\gamma$-$Fe_4N$ increases resistivity while expanding lattice constants to provide improved coercivity at higher resistivity. Increasing the percentage of $\gamma$-$Fe_4N$ to provide expanding lattice constants for both the $\alpha$-Fe and the $\gamma$-$Fe_4N$ may be accomplished by adjusting sputtering power, $N_2$ gas percentage, a flow rate of $N_2$, and substrate bias. In some embodiments, high sputtering power of about 3–4 kW with about 15–30 percent of $N_2$ may be used to sputter FeX, where X is selected from the group consisting of Rh, Ta, Hf, Al, Zr, Ti, Ru, Si, Cr, V, Si, Sr, Nb, Mo, Ru, and Pd, to provide expanding $\alpha$-Fe and $\gamma$-$Fe_2N$ lattice constants. In some embodiments, FeXN films having resistivity values greater than about 50 $\mu\Omega$cm, 80 $\mu\Omega$cm, 100 $\mu\Omega$cm, 115 $\mu\Omega$cm, or more, for coercivity values less than about 10 Oe, 5 Oe, or 3 Oe are possible, for values of $B_s$ greater than around 12 kG to 17 kG. Embodiments may be used for pole or shield structures in magnetic heads for data storage and retrieval apparatuses to improve high frequency performance.

24 Claims, 6 Drawing Sheets

OTHER PUBLICATIONS

Inturi, V.R. and Barnard, V.R., "Studies of laminated and single layer high moment soft FeTaN films," *J. Appl. Phys.*, vol. 81, No. 8, Part 2, Apr. 15, 1997, pp. 4504–4506.

Jones, Jr., R.E., "Magnetic Properties of Fe(N)/NiFe(N) Sputtered on Sloping Surfaces," *IEEE Transactions on Magnetics*, vol. 32, No. 5, Sep. 1996, pp. 4588–4590.

Katori, Kenji, Hayashi, Kazuhiko, Hayakawa, Masatoshi and ASO, Koichi, "Soft Magnetic Properties for Fe–Al–N / Si–N Multilayered Films," *Journal of the Magnetic Society of Japan*, vol. 13, Supplement S1, 1989, pp. 335–339.

Kubota, K. and Naoe, M., "Magnetic properties of Fe–N/Al–N multilayered films prepared by ion–assist sputtering," *J. Appl. Phys.*, vol. 69, No. 8, Apr. 15, 1991, pp. 5295–5297.

Maass, W. and Rohrmann, H., "Improved Magnetic Anisotropy and Magnetorestriction by Laminating FeAl(N) with Permalloy to Multilayers," *IEEE Transactions on Magnetics*, vol. 34, No. 4, Jul. 1998, pp. 1435–1437.

Makino, S., Shinkai, S., Takeshima, Y., Nakamura, T., Yabuta, M. and Kitamura, M., "High Density Recording FeTaN Laminated Hard Disk Heads," *IEEE Transactions on Magnetics*, vol. 29, No. 6, Nov. 1993, pp. 3882–3884.

Nago, K., Aokura, I., Yamanishi, H., Sakakima, H., and Osano, K., "Substrate Bias Effect on the Magnetic Properties of Fe–Ta–N Films, " *IEEE Translation Journal on Magnetics in Japan*, vol. 8, No. 12, Dec. 1993, pp. 934–940.

Nguyentran, Lee, Sin, Kyusik, Hong, Jongill, Pizzo, Patrick P., Wang, Shan X., "Corrosion Resistance of Low Coercivity, High Moment FeXN (X=Rh, Mo) Thin Film Head Materials," *Department of Materials Engineering Manuscript*, Stanford University, California, Jan. 31, 1997, pp. 1–3.

W. Maass et al. "Improved Magnetic Anisotrophy . . . " IEEE Transactions on Magnetics, vol. 34, No. 4, Jul. 1998.*

Russak, Michael A., Jahnes, Christopher V., Klokholm, Erik, Lee, Jo–Won, Re, Mark E. and Webb, C. Bucknell, "Magnetic and structural characterization of sputtered FeN multilayer films," *J. Appl. Phys.*, vol. 70, No. 10, Nov. 15, 1991, pp. 6427–6429.

Sin, Kyusik and Wang, Shan X., "FeN/AlN Multilayer Films For High Moment Thin Film Recording Heads," *IEEE Transactions on Magnetics*, vol. 32, No. 5, Sep. 1996, pp. 3509–3511.

Slonczewski, John C., Petek, Bojan and Argyle, Bernell E., "Micromagnetics of Laminated Permalloy Films," *IEEE Transactions on Magnetics*, vol. 24, No. 3, May 1988, pp. 2045–2054.

Li, Shuxiang, Freitas, P.P., Rogalski, M.S., Azaevedo, M., Sousa, J.B., Dai, Z.N., Soares, J.C., Matsakawa, N. and Sakakima, H., "Magnetic properties and structure of a new multilayer [FeTaN/TaN]n for recording heads," *J. Appl. Phys.*, vol. 81, No. 8, Apr. 15, 1997, pp. 4501–4503.

van de Riet, E., Klaassens, W. and Roozeboom, F., "On the origin of the uniaxial anistropy in nanocrystalline soft–magnetic materials," *J. Appl. Phys.* vol. 81, vol. 2, Jan. 15, 1997.

Wang, S., Obermyer K.E. and Kryder, M.H., "Improved High Moment FeAlN/SiO2 Laminated materials for Thin Film Recording Heads," *IEEE Transactions on Magnetics*, vol. 27, No. 6, Nov. 1991, pp. 4879–4881.

Wang, Xiang Wang, "Thin Film Recording Heads Using High Moment Soft Magnetic Materials," *A Dissertation*, Carnegie Mellon University, Pittsburgh, PA; Nov. 19, 1993, pp. 59–105.

Wang, S., Liu, F., Maranowski, K.D. and Kryder, M.H., "Fabrication and Performance of High Moment Laminated FeAlN Thin Film Inductive Recording Heads," *IEEE Transactions on Magnetics*, vol. 30, kNo. 2, Mar. 1994, pp. 281–286.

* cited by examiner

| SAMPLE | hkl | 2θ | PEAK | AREA | FWHM | GRAIN SIZE | LATTICE $a_0$ | LATTICE % EXPANSION |
|---|---|---|---|---|---|---|---|---|
| S1 | Fe(110) | 44.41 | 2977 | 2187 | 0.366 | 245 | 2.8825 | 0.5626 |
| 0408-5-1-23 | Fe(200) | 64.7 | 85 | | | | 2.8791 | 0.4445 |
| 2%N2 | Fe(211) | 81.99 | 65 | 115 | 0.9995 | 110 | 2.8763 | 0.3458 |
| | Fe(220) | 98.6 | 135 | | 0.55 | 231 | 2.8738 | 0.2587 |
| | Fe(310) | 116.35 | 270 | | 2.45 | 64 | 2.8669 | 0.0176 |
| | | | | | | | | |
| S2 | Fe(110) | 44.42 | 2952 | 10562 | 1.58 | 57 | 2.8819 | 0.5411 |
| 0408-1-2-23 | Fe(220) | 98.6 | 154 | | 2.6 | 49 | 2.8738 | 0.2587 |
| 15%N2 | Fe$_4$N(200) | 47.6 | 3788 | 13904 | 1.561 | 58 | 3.8177 | 0.5972 |
| | Fe$_4$N(200) | 48.26 | 12363 | 14937 | 0.658 | 138 | 3.7685 | -0.6979 |
| | Fe$_4$N(400) | 110.55 | 458 | | 2.7 | 54 | 3.7489 | -1.2149 |
| | | | | | | | | |
| S3 | Fe(110) | 44.35 | 3299 | 6979 | 0.916 | 98 | 2.8862 | 0.6917 |
| 0408-1-4-23 | Fe(220) | 98.33 | 79 | 366 | 1.96 | 65 | 2.8797 | 0.4625 |
| 20%N2 | Fe$_4$N(200) | 47.534 | 34063 | 49535 | 0.656 | 138 | 3.8227 | 0.7287 |
| | Fe$_4$N(400) | 108.15 | 672 | 2697 | 1.8 | 79 | 3.8050 | 0.2624 |

FIG. 5

HIGH RESISTIVITY FEXN SPUTTERED FILMS FOR MAGNETIC STORAGE DEVICES AND METHOD OF FABRICATION

BACKGROUND

The trend of ever increasing magnetic storage density and data transfer rates requires magnetic materials with superior characteristics. Soft magnetic materials with high magnetic flux density $B_s$ are of great interest for thin film write head applications. At high operating frequencies, eddy currents in the write head cause a reduction in the permeability of the pole material, which in turn reduces the efficiency of the head.

Lamination of the magnetic pole material with insulation layer is commonly used as a means to suppress the eddy-current loss during the high frequency operation as disclosed in U.S. Pat. No. 5,750,275, by Katz et al., entitled THIN FILM HEADS WITH INSULATED LAMINATION FOR IMPROVED HIGH FREQUENCY PERFORMANCE, issued May 12, 1998, herein incorporated by reference in its entirety. Laminating with an insulative material, however, also reduces the $B_s$ of the structure.

Recently high $B_s$ Co-based or Fe-based amorphous alloys with high intrinsic electrical resistivity $\rho$ have also received great attention, such as disclosed in U.S. Pat. No. 5,725,685, by Hayakawa et al., entitled SOFT MAGNETIC ALLOY THIN FILM WITH NITROGEN-BASED AMORPHOUS PHASE, issued Mar. 10, 1998. Such alloys, however have relatively low $B_s$, typically less than about 15 kG, and often suffer from poor thermal stability and corrosion resistance.

Other work has shown increasing resistivity of FeXN sputtered films using $N_2$, but, this work has also shown a corresponding reduction in coercivity. Such work has shown FeXN formed primarily of $\alpha$ phase or body centered cubic Fe, with only a small portion of $\gamma$ phase or face centered cubic $Fe_4N$.

What is desired is a soft magnetic material having high magnetic moment $B_s$, low magnetostriction $\lambda_s$, high permeability, high frequency performance, corrosion resistance, and thermal stability.

SUMMARY

A preferred method of the present invention provides an improved thin film for carrying magnetic flux. With the preferred method, the magnetic thin film may be formed by depositing Fe by reactive sputtering using $N_2$ to form a thin film comprising $\alpha$-Fe and $\gamma$-$Fe_4N$. With this method, the relative percentage of $\gamma$-$Fe_4N$ in the deposited film is increased to provide expanded lattice constants for both the $\alpha$-Fe and the $\gamma$-$Fe_4N$. Increasing $\gamma$-$Fe_4N$ increases resistivity while expanded lattice constants provide improved coercivity in higher resistivity films.

Increasing the percentage of $\gamma$-$Fe_4N$ to provide expanded lattice constants for both the $\alpha$-Fe and $\gamma$-$Fe_4N$ may be accomplished by adjusting sputtering power, $N_2$ gas percentage, a flow rate of $N_2$, and substrate bias. In some embodiments, high sputtering power of about 3–4 kW with about 15–30 percent of $N_2$ may be used to sputter FeX, where X is selected from the group consisting of Rh, Ta, Hf, Al, Zr, Ti, Ru, Si, Cr, V, Sr, Nb, Mo, Ru, and Pd, to provide expanded $\alpha$-Fe and the $\gamma$-$Fe_4N$ lattice constants.

In preferred methods and embodiments of the present invention, high resistivity low coercivity FeXN thin films are possible. In some embodiments, FeXN films having resistivity values greater than about 50 $\mu\Omega$cm, 80 $\mu\Omega$cm, 100 $\mu\Omega$cm, 115 $\mu\Omega$cm, or more, for coercivity values less than about 10 Oe, 5 Oe, or 3 Oe are possible. Furthermore, these results may be obtained for values of $B_s$ greater than around 12 kG to 17 kG.

Embodiments of the improved thin film of the present invention may be used for pole or shield structures in magnetic heads, such as disk, tape, or other type data storage and retrieval apparatuses, to improve high frequency performance.

DESCRIPTION OF PREFERRED METHODS AND EMBODIMENTS

A preferred method of the present invention provides an improved thin film for carrying magnetic flux. The preferred method of the present invention allows formation of a mixed phase FeXN thin film having $\alpha$-Fe and the $\gamma$-$Fe_4N$. With a preferred method, the deposition of Fe in the presence of $N_2$ is controlled so as to increase the relative percentage of $\gamma$-$Fe_4N$ to provide a high resistivity low coercivity film.

In one preferred method, an FeRh target with approximately 3% of Rh is reactively sputtered in the presence of $N_2$. FIGS. 1A–1E represent empirical data of an FeRhN film reactively sputtered, using DC magnetron sputtering, in a $N_2$/Ar gas mixture onto glass substrates. The sputtering conditions have significant effects on the microstructural and magnetic properties of the films.

With the presently preferred method, the sputtering parameters such as sputtering power, substrate bias, total gas pressure, $N_2$/Ar flow ratio, total gas flow rate, substrate-to-target spacing are controlled to provide the high resistivity low coercivity film of the preferred embodiment of the present invention. In the preferred method for fabricating a preferred embodiment, a high energy sputtering process is used. Various high energy sputtering processes may be obtained by varying the sputtering parameters to provide embodiments of the present invention.

With the embodiment of FIGS. 1A–1E, a high sputtering power of about 3.5 kW, 2 mTorr gas pressure, −100V substrate bias, 4 inches of substrate-to-target spacing, a 13 inch diameter target, and a total gas flow of 120 sccm, for a deposition time of 6 minutes, in a Nordiko 9550 sputtering system, manufactured by Nordiko of Hampshire, England, was used. This provided high sputtering power density. The high sputtering power results in a high deposition rate of about 20–30 Å/s.

The high sputtering power also results in a more rapid increase in the substrate temperature due to plasma heating. A high substrate bias of −100 V was used. Proper heating and substrate bias promote the atomic mobility of the sputtered atoms so that the desired nanocrystalline microstructure may be achieved.

Also with the embodiment of FIGS. 1A–1E, a low gas pressure of 2 mTorr was used so that the ions and atoms carry more kinetic energy due to longer mean-free-path. The substrate-to-target spacing was kept at about 4 inches as an increase in the spacing was found to deteriorate the soft magnetic properties and uniformity of the film.

FIGS. 1A–1E show the dependence of resistivity, coercivity, $B_s$, uniformity, and thickness on $N_2$% in the sputtering gas for this embodiment of the present invention. In this embodiment, the sputtering rate monotonically decreases while the electrical resistivity increases with $N_2$%. Two soft magnetic regions at $N_2$% of 3–5% and 22–25% can be clearly identified in FIG. 1B. Coercivity for both the easy and hard axes in this region is less than 10 Oe. The resistivity values of the two phases are around 20 $\mu\Omega$cm and 90 $\mu\Omega$cm. The $B_s$ of a low resistivity phase is more than 20 kG, whereas the $B_s$ of the high resistivity phase is about 17 kG. In this embodiment, poor soft magnetic properties as well as large nonuniformity are shown at intermediate values of $N_2$%. The $B_s$ values of the films deposited at intermediate values of $N_2$% could not be accurately measured using the BH looper using a maximum field of 75 Oe, which was insufficient to saturate these films.

Figure 1A:
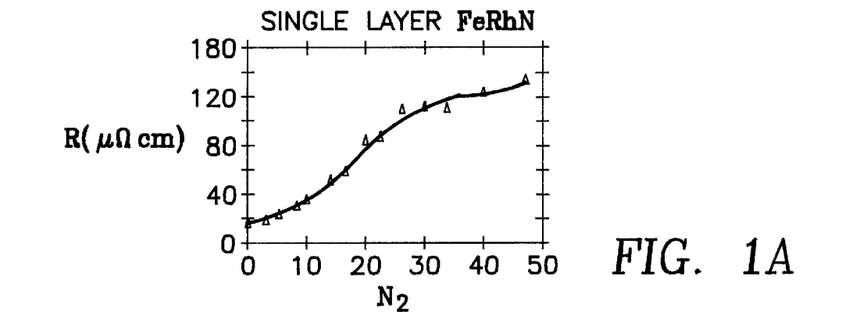
FIGS. 1A–1E show the dependence of resistivity, coercivity, $B_s$, uniformity, and thickness, respectively, on $N_2\%$ in the sputtering gas for a preferred embodiment in accordance with the present invention.
Figure 1B:
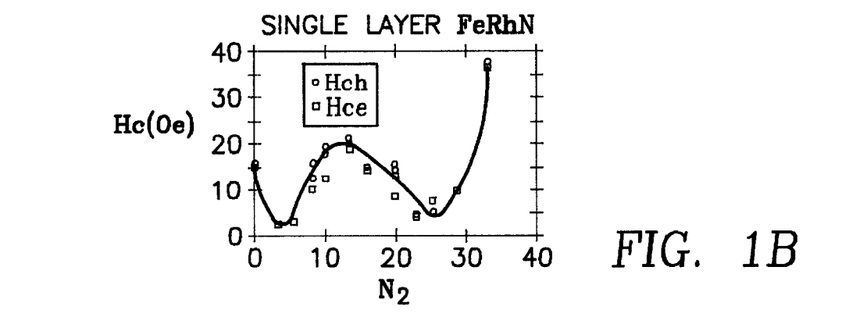
Figure 1C:
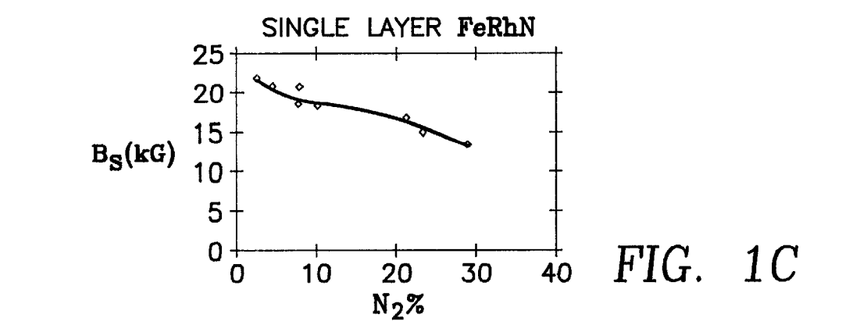
Figure 1D:
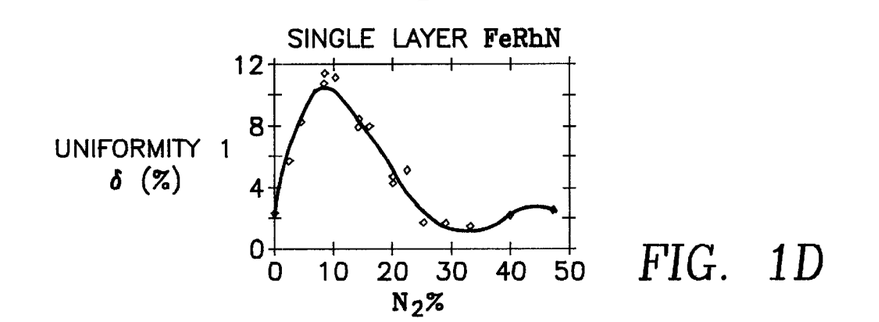
Figure 1E:
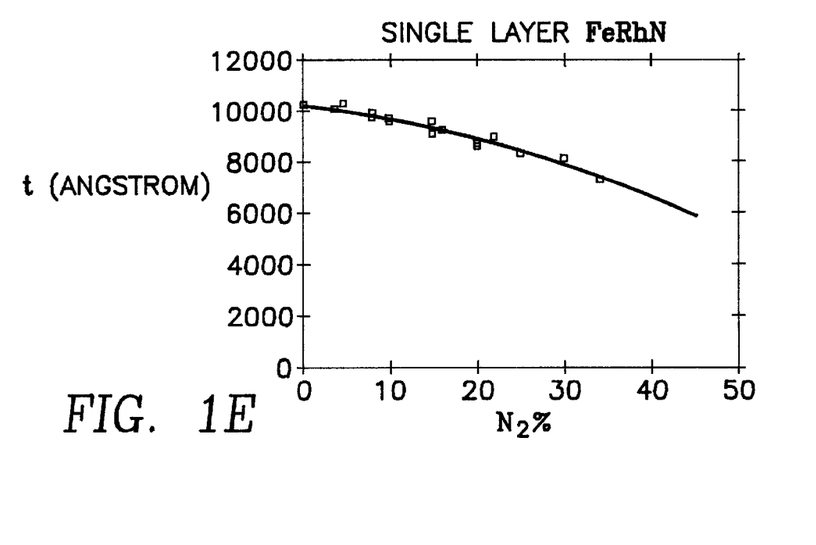
Figure 2:
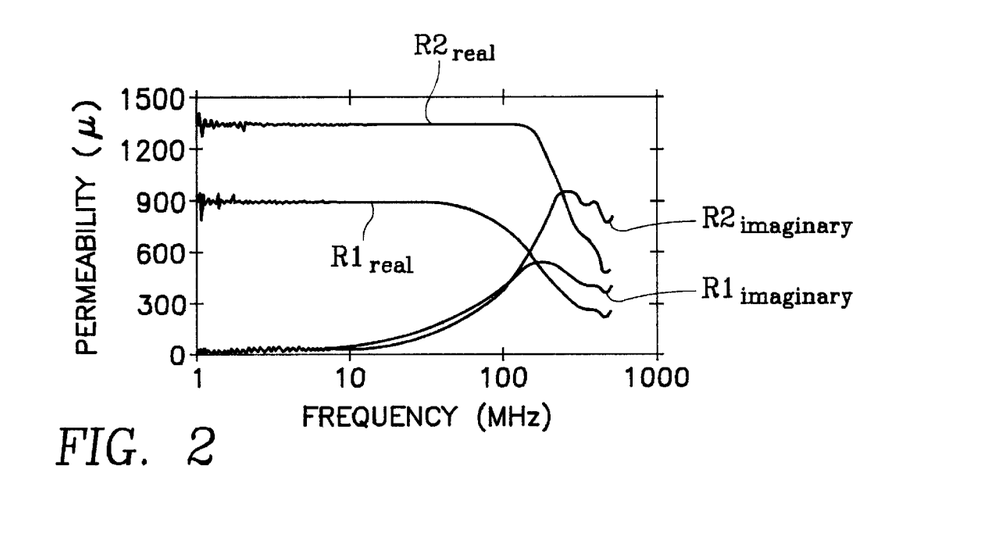
FIG. 2 is a graph showing the improvement of permeability versus frequency and for an embodiment R2 in accordance with a preferred embodiment of the present invention.

FIG. 2, shows the permeability verses frequency for two FeRhN films. Deposition of R1 with 3.3% $N_2$, provides a high moment of 21.3 kG but low resistivity of 19 $\mu\Omega$cm. Deposition of R2 with 22.5% $N_2$ provides a mixed phase embodiment in accordance with the present invention having a moment of 17 kG with high resistivity of 86 $\mu\Omega$cm. In this embodiment, both films have poorly defined anisotropy direction and open hard axis loops as evidenced by the low absolute values of permeability for both films. Nonetheless, the onset of decay of the real part of permeability is clearly extended to a higher frequency of about 100 MHz in film R2, due to its higher resistivity.

Figure 3A:
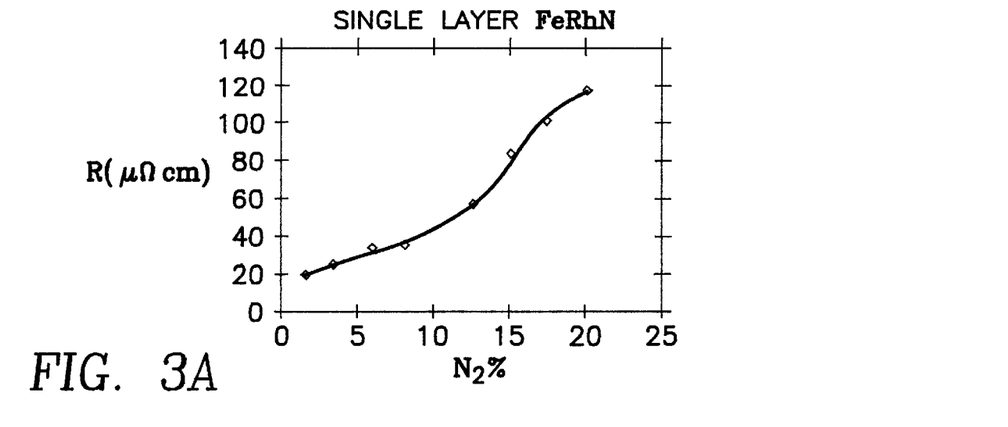
FIGS. 3A–3C show the dependence of resistivity, coercivity, and $B_s$, respectively on $N_2\%$ in the sputtering gas for another preferred embodiment in accordance with the present invention.
Figure 3B:
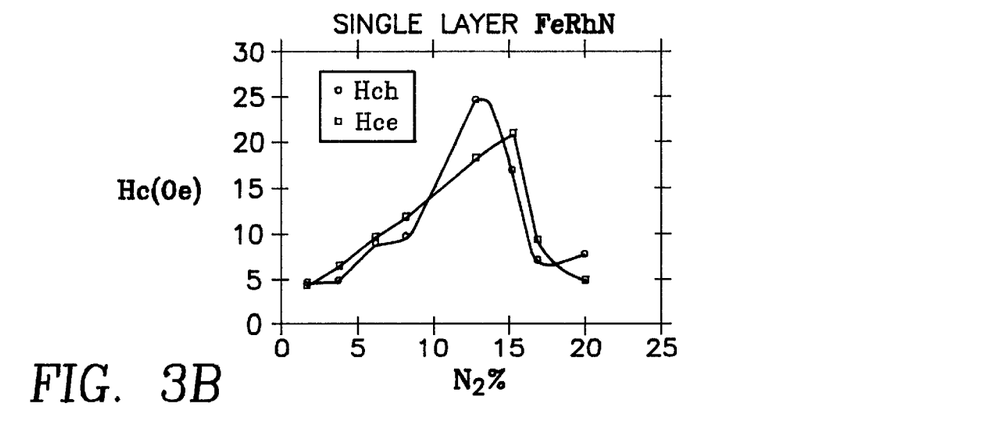
Figure 3C:
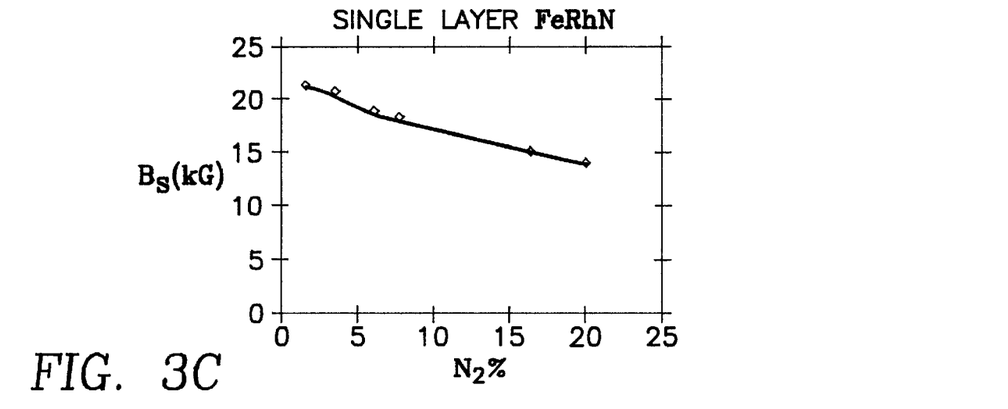

Turning to FIGS. 3A–3C, by using slightly different deposition conditions, the values of $B_s$ and resistivity can be adjusted while maintaining the soft magnetic properties. A slightly lower atomic energy results in lower crystallinity of the film and higher $N_2$ inclusion. Higher inclusion of $N_2$ allows higher percent of $\gamma$-$Fe_4N$ to be formed, which leads to slightly lower $B_s$ but higher resistivity.

Referring to FIGS. 3A–3C, in another method and embodiment of the invention, an FeRhN film is formed by reactive sputtering using a lower power of 3 kW and a larger substrate-to-target spacing of 4.4 inches. A higher total gas flow of 400 sccm was also used. As shown in FIGS. 3A & 3B, similar to the trend shown in FIGS. 1A & 1B, there are two distinct soft magnetic regions which exhibit low and high resistivity values. In the embodiment of FIGS. 3A–3C, the easy and hard axes coercivity is around 5 Oe for about 2% and about 17% percent $N_2$. As compared to the films shown in FIGS. 1A–1E, the high resistivity phase has a higher resistivity of 116 $\mu\Omega$cm and a lower $B_s$ of 14.1 kG.

Figure 4A:
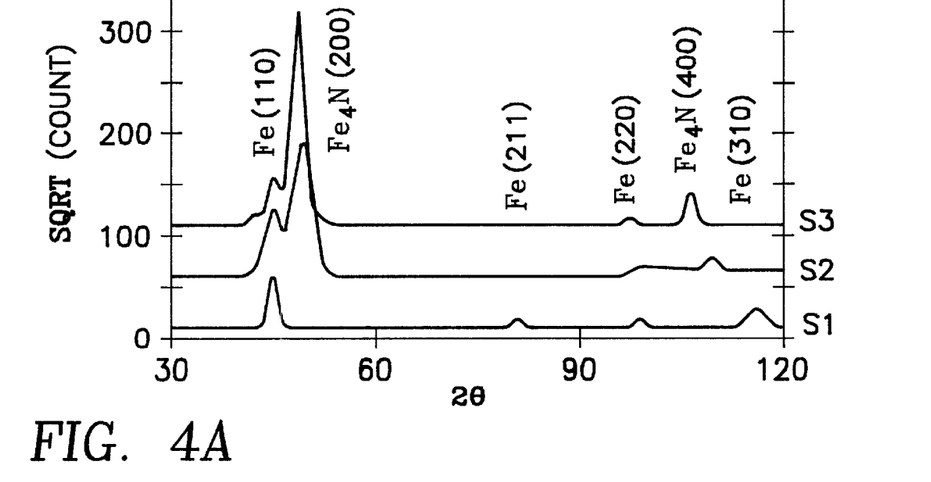
FIG. 4A shows a graph of X-ray diffraction patterns of samples S1, S2, and S3.
Figure 4B:
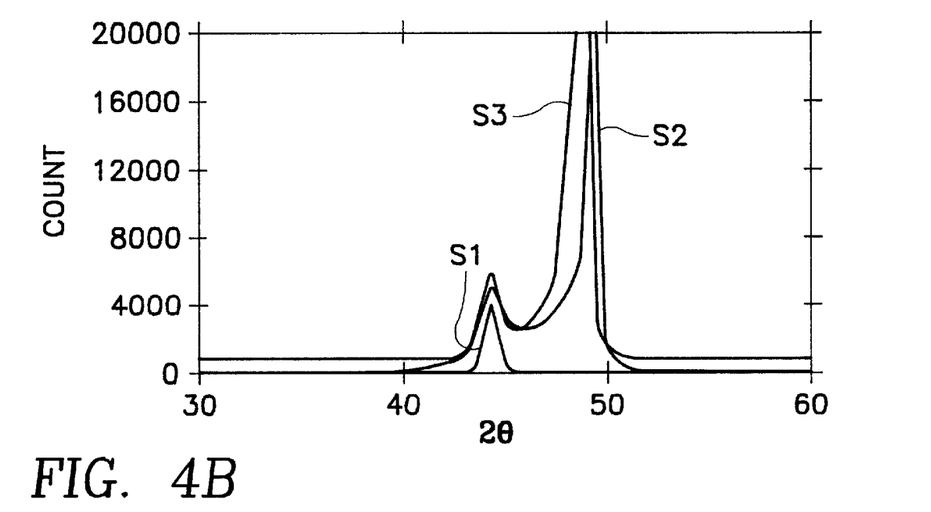
FIG. 4B shows a magnified view of FIG. 4A.
Figure 4C:
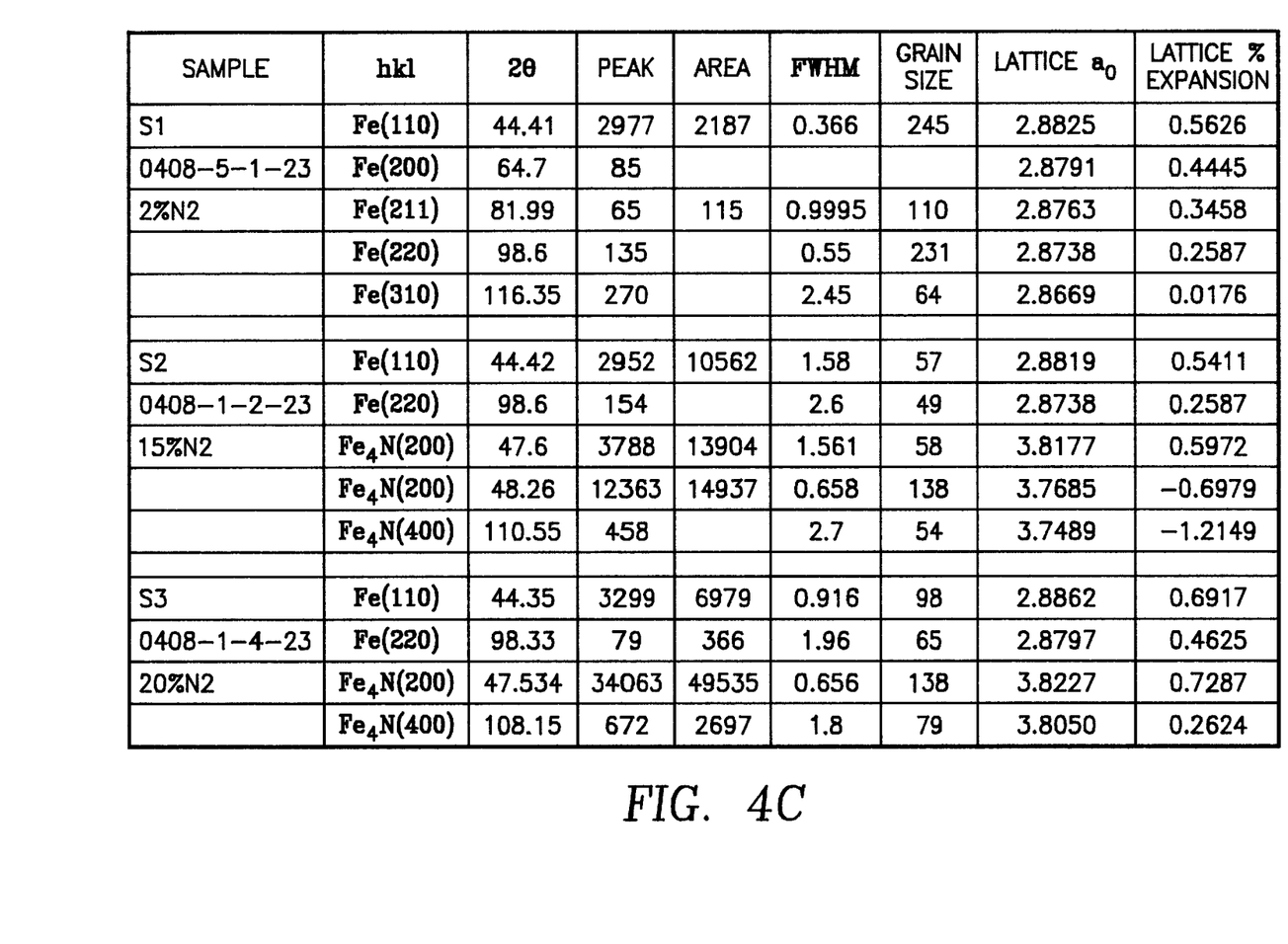
FIG. 4C shows tabulated data of the graph of FIG. 4A.

FIGS. 4A–4C show X-ray diffraction results of three films S1, S2 and S3 represented in FIGS. 3A–3C. S1, S2, and S3 were formed at 2%, 15%, and 20% $N_2$, respectively. It can be seen from FIG. 3B that S2 has poor soft magnetic properties, while S1 and S3 have good soft magnetic properties. Bcc or $\alpha$-Fe phase is found in all three films. Additional $\gamma$-$Fe_4N$ diffraction peaks are present in S2 and S3.

S2, though, has two sets of distinguishable $\gamma$-$Fe_4N$ crystals as more easily seen in the tabulated values of FIG. 4C. One set of crystals have a slightly expanded lattice constant, as indicated by the positive value for the percent of lattice expansion, while another set is slightly contracted, as indicated by the negative values for percent of lattice expansion. Furthermore, as indicated by the magnitude of the diffraction peak (PEAK) and the area under the diffraction peak (AREA), and the relative percentage of the lattice expansions of the respective peaks, the net lattice expansion for $\gamma$-$Fe_4N$ in this sample also is negative.

Film S3 contains only $Fe_4N$ phases with expanded crystal lattice. In S3, the $Fe_4N$ (220) peak is much stronger than the Fe (100) peak, indicating a significant percentage of $Fe_4N$ phase as compared to $\alpha$-Fe.

It should also be noted that the $\alpha$-Fe phases in all three films have expanded lattice constants as compared to bulk $\alpha$-Fe.

As such, the preferred methods and embodiments of the present invention provide at least a small amount of expansion of both $\alpha$-Fe and $\gamma$-$Fe_4N$ lattice constants to provide high resistivity films with more desirable soft magnetic properties. In one preferred embodiment, lattice expansion of about 0.3% for both phases provides desirable results. Further, sputtering processes with considerably lower energy provide poor soft magnetic properties. For example using a sputtering power of 1 kW, a higher gas pressure of 4 mT, a total gas flow rate of 400 sccm, zero substrate bias, and 15% $N_2$ produced a FeRhN film having $H_c$ larger than 15 Oe. X-ray diffraction patterns of this film showed mostly $Fe_4N$ phase with lattice contraction by about 0.3–0.9% as compared to the bulk value. This film also showed dominant $Fe_4N$ (111) crystallographic texture and no $\alpha$-Fe peak was observed.

The microstructural characteristics of the preferred embodiment have fine grains of $\alpha$-Fe and $\gamma$-$Fe_4N$, with sizes on the order of 100–200 Å. Slightly expanded lattice parameters of both phases result in desirable soft magnetic properties of the film. The significant amount of $\gamma$-$Fe_4N$ phase gives rise to much higher resistivity than conventional FeXN films. The high resistivity film of the preferred embodiment improves the high frequency permeability.

It should also be noted that in some embodiments, such as in S3, increasing the relative percentage of $\gamma$-$Fe_4N$ to provide a greater percentage of $\gamma$-$Fe_4N$ than of $\alpha$-Fe provides a high resistivity low coercivity film.

Although not shown here, similar experimental results also were obtained in FeTaN films using similar deposition parameters. It also is expected that other FeXN films with X comprising Hf, Al, Zr, Ti, Ru, Si, Cr, V, Sr, Nb, Mo, Ru, Pd, or the like will provide similar results. In the preferred embodiments, the amount of X material will not significantly change the phase of the film, but will fine tune the mechanical properties, such as wear resistance, corrosion, etc. Thus, in the preferred embodiments, X is typically in the range of about 3 to 5 atomic percent.

Thus, in preferred methods and embodiments high resistivity low coercivity FeXN thin films are possible. In some embodiments, FeXN films having resistivity values greater than about 50 $\mu\Omega$cm, 80 $\mu\Omega$cm, 100 $\mu\Omega$cm, 115 $\mu\Omega$cm, or more for coercivity values less than about 10 Oe, 5 Oe, or 3 Oe are possible. Furthermore, these results may be obtained for values of $B_s$ greater than around 12 kG to 17 kG.

The preferred methods for fabricating the thin film of the present invention may be employed to form the flux carrying structures of a write head such as upper or lower pole structures, yoke or pedestal portions of the pole structures, or other known flux carrying structures. The preferred methods for fabricating the thin film of the present invention also may be employed to form shield structures. Embodiments of the write head of the present invention may have a conventional structure well known in the art, or may have a laminated structure as disclosed in U.S. patent application Ser. No. 09/192,388, by Chen et al., entitled THIN FILM WRITE HEAD WITH IMPROVED LAMINATED FLUX CARRYING STRUCTURE AND METHOD OF FABRICATION, filed Nov. 13, 1998, issued on May 15, 2001, as U.S. Pat. No. 6,233,116, herein incorporated by reference in its entirety.

Figure 5:
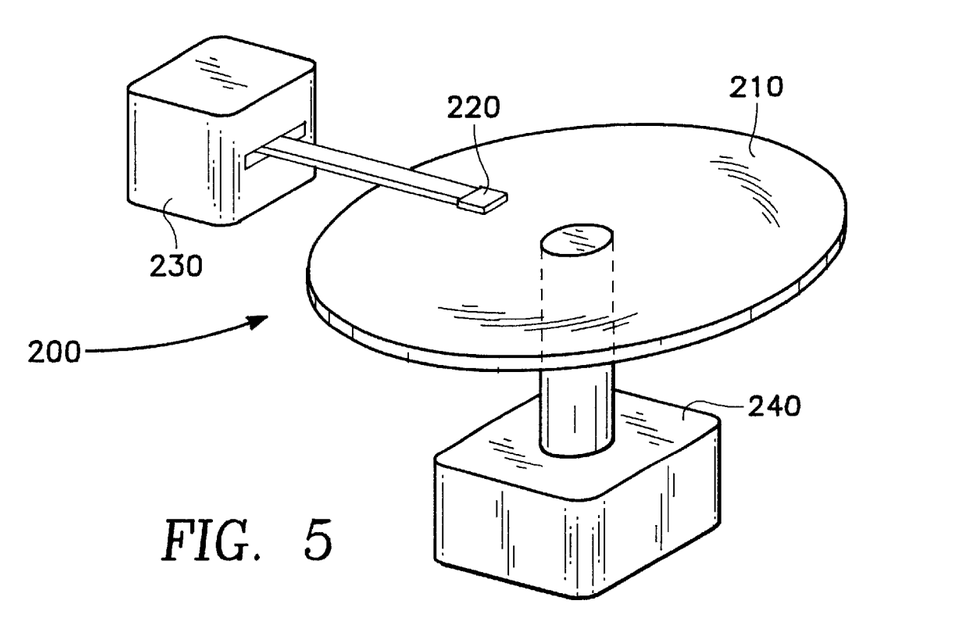
FIG. 5 illustrates a data storage and retrieval apparatus employing the improved thin film write head of the present invention.

The high resistivity material of the preferred embodiment of the present invention may be employed to provide an improved data storage and retrieval apparatus as conceptually depicted in FIG. 5. FIG. 5 shows a thin film write head embodied in a disk type magnetic data storage and retrieval apparatus 200. The write head of the present invention is located within a merged head assembly 220 which rides above a magnetic storage media 210, depicted in FIG. 5 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220. The improved flux carrying structure of the present invention is intended to be utilized in all known data storage and retrieval apparatuses. By way of non-exclusive example, the present invention is also intended to improve magnetic tape type storage and retrieval apparatuses, or any other known types of magnetic storage and retrieval apparatuses.

While the preferred embodiments and methods of the present invention have been described in detail above, many changes to these embodiments and methods may be made without departing from the true scope and teachings of the present invention. The present invention, therefore, is limited only as claimed below and the equivalents thereof.

What we claim is:

1. A method for fabricating a magnetic thin film comprising:
    a) depositing Fe by sputtering using $N_2$ to form a thin film comprising $\alpha$-Fe and $\gamma$-$Fe_4N$ having relative percentages; and
    b) controlling deposition characteristics to increase the relative percentage of $\gamma$-$Fe_4N$ to $\alpha$-Fe to provide expanded lattice constants for both the $\alpha$-Fe and the $\gamma$-$Fe_4N$.

2. The method of claim 1 wherein depositing Fe comprises depositing a greater percentage of $\gamma$-$Fe_4N$ than of $\alpha$-Fe.

3. The method of claim 1 wherein controlling deposition characteristics comprises adjusting at least one of a sputtering power, a percentage of $N_2$, a flow rate of $N_2$, and a substrate bias.

4. The method of claim 1 wherein controlling deposition characteristics comprises using high energy sputtering.

5. The method of claim 1 wherein controlling deposition characteristics further comprises providing greater than about 15% of $N_2$ gas.

6. The method of claim 1 wherein depositing Fe comprises sputtering FeX, where X is selected from the group consisting of Rh, Ta, Hf, Al, Zr, Ti, Ru, Si, Cr, V, Si, Sr, Nb, Mo, Ru, and Pd.

7. The method of claim 1 wherein the thin film further comprises FeRhN.

8. The method of claim 1 wherein the thin film further comprises FeTaN.

9. The method of claim 6 wherein controlling deposition characteristics further comprises providing greater than about 15% of $N_2$ gas.

10. The method of claim 9 wherein controlling deposition characteristics further comprises using a sputtering power greater than about 3 kW.

11. The method of claim 4 wherein controlling deposition characteristics further comprises providing greater than about 15% $N_2$ gas.

12. The method of claim 1 wherein the expanded lattice constants are greater than lattice constants of bulk $\alpha$-Fe.

13. A magnetic thin film fabricated by:
    a) depositing Fe by sputtering using $N_2$ to form a thin film comprising $\alpha$-Fe and $\gamma$-$Fe_4N$ having relative percentages, and
    b) controlling deposition characteristics to increase the relative percentage of $\gamma$-$Fe_4N$ to provide expanded lattice constants for both the $\alpha$-Fe and the $\gamma$-$Fe_4N$.

14. The magnetic thin film of claim 13 wherein depositing Fe comprises depositing a greater percentage of $\gamma$-$Fe_4N$ than of $\alpha$-Fe.

15. The magnetic thin film of claim 13 wherein controlling deposition characteristics comprises adjusting at least one of: a sputtering power, a percentage of the $N_2$, a flow rate of $N_2$, and a substrate bias.

16. The magnetic thin film of claim 13 wherein controlling deposition characteristics comprises using high energy sputtering.

17. The magnetic thin film of claim 16 wherein controlling deposition characteristics further comprises providing greater than about 15% of the $N_2$ gas.

18. The magnetic thin film of claim 13 wherein depositing Fe comprises sputtering FeX, where X is selected from the group consisting of Rh, Ta, Hf, Al, Zr, Ti, Ru, Si, Cr, V, Sr, Nb, Mo, Ru, and Pd.

19. The magnetic thin film of claim 18 wherein controlling deposition characteristics comprises providing greater than about 15% of $N_2$ gas.

20. The magnetic thin film of claim 19 wherein controlling deposition characteristics comprises using a sputtering power greater than about 3 kW.

21. The magnetic thin film of claim 13 wherein controlling deposition characteristics comprises providing greater than about 15% $N_2$ gas.

22. The magnetic thin film of claim 13 wherein the expanded lattice constants are greater than the lattice constants of bulk $\alpha$-Fe.

23. A magnetic thin film comprising:
    $\alpha$-Fe; and
    $\gamma$-$Fe_4N$ where lattice constants for both $\alpha$-Fe and $\gamma$-$Fe_4N$ are expanded as compared to lattice constants of bulk $\alpha$-Fe.

24. The magnetic thin film of claim 23 wherein:
    the lattice constants are expanded to about 0.3%.

* * * * *